United States Patent
Wang

(10) Patent No.: US 6,412,954 B1
(45) Date of Patent: Jul. 2, 2002

(54) DUST-PROOF DEVICE FOR SOLID INTEGRATION ROD IN PROJECTING APPARATUS

(75) Inventor: Ken Wang, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 42 days.

(21) Appl. No.: 09/721,546

(22) Filed: Nov. 22, 2000

(30) Foreign Application Priority Data

Oct. 24, 2000 (TW) ...................................... 89218497 U

(51) Int. Cl.⁷ .............................. G03B 21/14; G02B 6/24
(52) U.S. Cl. ......................... 353/98; 353/119; 353/122; 385/51
(58) Field of Search .......................... 353/98, 119, 122; 385/147, 51, 39, 15; 348/804

(56) References Cited

U.S. PATENT DOCUMENTS 4,790,620 A * 12/1988 Niwayama et al. ........... 385/51
6,139,156 A * 10/2000 Okamori et al. ............... 353/98

* cited by examiner

*Primary Examiner*—W. B. Perkey
(74) *Attorney, Agent, or Firm*—Winston Hsu

(57) ABSTRACT

A dust-proof device for a solid integration rod in projecting apparatuses is provided in the invention. The solid integration rod has a layer of metal reflecting film with a certain length in axial direction. The layer of metal reflecting film is coated on the circumferential outer surface at an end of the solid integration rod that is adhered to the dust-proof element of the dust-proof device. The metal reflecting film is provided so that if a flared portion of the adhesive occurs after the dust-proof device is adhered to the solid integration rod, the metal film will still reflect the light normally, and the light energy will not be lost through the flare portion.

4 Claims, 6 Drawing Sheets

DUST-PROOF DEVICE FOR SOLID INTEGRATION ROD IN PROJECTING APPARATUS

BACKGROUND OF THE INVENTION

A. Field of the Invention

The invention relates to a dust-proof device for a solid integration rod in projecting apparatuses, and particularly, to a dust-proof element being adhered to the solid integration rod in projecting apparatuses so that dust does not become attached to the solid integration rod. Furthermore, the solid integration rod can improve upon the problem of light energy loss due to flare portion of the adhesive.

B. Description of the Related Art

The conventional projecting display apparatus can be a transmissive LCD (liquid crystal display), a reflective LCD, a digital micro-mirror device (hereinafter referred as DMD), or any other type of display component. Referring to FIG. 1, a schematic system diagram for a conventional projecting apparatus uses a transmissive LCD projecting display apparatus. Such projecting apparatus consists of a reflection mirror 10, a light source 11, a first lens set 12, a solid integration rod 13, a second lens set 14, a projecting display apparatus 15, an image formation device 16, and a display screen 17. The first lens set consists of at least one lens. The solid integration rod 13 is an optical device that can homogenize the light passing through the device using an incident-beam surface 137 and an outgoing-beam surface 138. The second lens set consists of at least one lens or optical element.

By means of the structure mentioned above, the light, either transmitted directly from the light source 11 or reflected from the reflection mirror 10 passes through the first lens set 12 and then converges on the incident-beam surface 137 of the solid integration rod 13. The light is homogenized after passing through the solid integration rod 13. Afterward, the light passes through the second lens set 14 and reaches the projecting display apparatus 15 so that the image of the projecting display apparatus 15 is projected on the display screen 17 through the image formation device 16.

The conventional projecting display apparatus 15 shown in FIG. 2 is a DMD. The light, once reaching the projecting display apparatus 15, is refracted to the image formation device 16 so as to project the image of projecting display apparatus 15 on the display screen 17.

The conventional projecting display apparatus 15 shown in FIG. 3 is the reflective LCD. The light, after passing through the second lens set 14 and then reaching the projecting display apparatus 15, is reflected back to the second lens set 14 again. Afterward, the light then turns 90 degree and reaches the image formation device 16. Therefore the image of projecting display apparatus 15 is projected on the display screen 17.

The main function of the above mentioned solid integration rod 13 is to homogenize the light passing through so as to achieve the effect of making the projected image uniform. At present, an integration rod is the component most frequently used to achieve uniform image projection. Usually an integration rod can be classified as a hollow integration rod or a solid integration rod wherein, the hollow integration rod is an optical rod forming a hollow column whose internal surface is coated with a layer of reflecting film which reflects the light beam multiple times inside the optical rod while passing through the optical rod, after which the light beam is emitted from the optical rod. The greater the number of times the light beam is reflected inside the optical rod, the more uniform the projected image emitted from the optical rod. However, the reflective index of the coated reflecting film itself has a limitation. When the length of the hollow integration rod is too long, the increase in the number of times the light beam reflects results in an increase in light energy loss and consequently, the illumination of the entire projection system is therefore reduced. Nevertheless, as long as the length of the hollow integration rod is adequate, producing a uniform projected image can be achieved without losing too much light energy. Thus, the hollow integration rod has an advantage of not requiring too much length. In contrast, the solid integration rod produces the light beam reflection completely inside the optical rod and then emits the light beam. Therefore, the energy of the light beam is not lost due to the influence of the length of the integration rod, which is the advantage of the solid integration rod. However, compared to the hollow integration rod, the incident angle of light beams entering the solid integration rod after refraction at the incident-beam surface is relatively smaller than the number of reflections of the light beams inside the optical rod. Thus, in order to achieve the same degree of uniformity in the projected image as that of the hollow integration rod, the length of the solid integration rod is necessary longer. It usually requires at least one and a half times the length as the hollow integration rod requires.

As mentioned above, the main function of the solid integration rod is to homogenize the light after it passes through in order to achieve a uniform projected image. Currently however, one problem that occurs during usage is that once dust attaches to the outgoing-beam surface 138 of the solid integration rod, an image of that dust will be projected on the display screen 17 rendering an unclear picture.

In recent tests, the dust on the outgoing-beam surface 138 of the solid integration rod 13 was projected on the display screen 17 while dust on the other area of the integration rod 13 was not projected on the display screen 17. Therefore, this problem can be resolved when a dust-proof approach is implemented on the outgoing-beam surface 138.

FIG. 4 refers to a conventional solid integration rod with a dust-proof structure wherein an integration rod 3 is provided with an incident-beam surface 31 and an outgoing-beam surface 32. The dust-proof structure consists of a housing 2, a dust-proof plate 4, a buffering pad 5 and a fastening cover 6.

Inside of housing 2 are a first chamber 21 and a second chamber 22 connected to each other wherein the cross section of the second chamber 22 is larger than, and is able to, thoroughly overlap that of the first chamber 21. The first chamber 21 contains the solid integration rod 3 and the opposite end of the second chamber 22 has a stopping portion 23 to stop the edge of the incident-beam surface 31 of the solid integration rod 3. The outgoing-beam surface 32 of the solid integration rod 3 is in the second chamber 22.

The dust-proof plate 4 is a transparent plate, such as a plate of an acryl plate, positioned in the second chamber 22 of the housing 2 to press against and completely cover the outgoing-beam surface 32 of the solid integration rod 3. The rubber buffering pad 5 has a window 51 in the central portion to cover the dust-proof plate 4.

The central portion of the fastening cover 6 also has a window 61. Two of its sidewalls are symmetrically provided with hooks 62 and 63 while the other two sidewalls are symmetrically provided with two stopping portions 64. The front end of the hook 62 is provided with a slant-guiding surface 621. The fastening cover 6 first covers the exterior of the buffering pad 5 and the dust-proof plate 4. Then the hook 63 hooks onto the recess (not shown) on the back of the second chamber 22 of the housing 2 while the hook 62 hooks onto the back of the second chamber 22 using its guiding surface 621. In this way, the dust-proof plate 4 and the buffering pad 5 are fixed to the second chamber 22.

By means of the above mentioned structure, the outgoing-beam surface 32 of the solid integration rod 3 can be completely covered by the dust-proof plate 4 so that no dust is accumulated on the outgoing-beam surface 32 and consequently no image of dust is projected on the display screen 17. Furthermore, the outgoing-beam surface 32 of the solid integration rod 3 presses against the dustproof plate 4 so that the incident-beam surface 31 presses against the stopping portion 23, and the fastening cover 6 covers the rim of the dust-proof plate 4. Thus, the outgoing-beam surface 32 of the solid integration rod 3 is completely free from blockage, and, thereby, the light can be transmitted without any shadows.

However, the construction of this dust-proof structure of solid integration rod is relatively complicated, and its assembly is time-consuming, and the cost of manufacture is high. These are the disadvantages of this conventional dust-proof structure for the solid integration rod.

SUMMARY OF THE INVENTION

Aiming at the disadvantages of the conventional dust-proof structure of a solid integration rod mentioned above, one of objects of the invention is to provide a dust-proof device for a solid integration rod in projecting apparatuses. The dust-proof device can prevent the dust from attaching to the outgoing-beam surface of the solid integration rod in order to fulfill the object of projecting a dust-free image on the display screen and to free the outgoing-beam surface completely from blockage. The dust-proof device of the solid integration rod can not only be achieve with a simple construction, easy fabrication, low manufacturing cost, and convenient maintenance, but can also avoid the loss of light energy resulting from the flare portion of the conventional dust-proof structure.

In order to achieve the above mentioned objectives, the invention provides a dust-proof device for the solid integration rod in projecting apparatuses including a layer of metal reflecting film of a certain length in axial direction coated on the circumferential outer surface of one end of the solid integration rod. The dust-proof device further includes a dust-proof element adhered to the solid integration rod with adhesive. If a flare portion occurs after the dust-proof device is adhered to the solid integration rod, the light will still be normally reflected by the metal reflecting film and the light energy will not be lost due to leaking through the flare portion.

The mentioned objectives, various other objectives, advantages, and features of the invention will be more fully understood from the following detailed description of the preferred aspect of the invention when considered in connection with the accompanying drawings.

BRIEF DESCRIPTION OF THE DRAWINGS

These and other objectives and advantages of the invention will become apparent by reference to the following description and accompanying drawings wherein.

DETAIL DESCRIPTION OF THE INVENTION

The preferred aspects of embodiments of a dust-proof device for a solid integration rod in projecting apparatus according to the invention is illustrated with reference to the accompanying drawings as follows.

Figure 1:
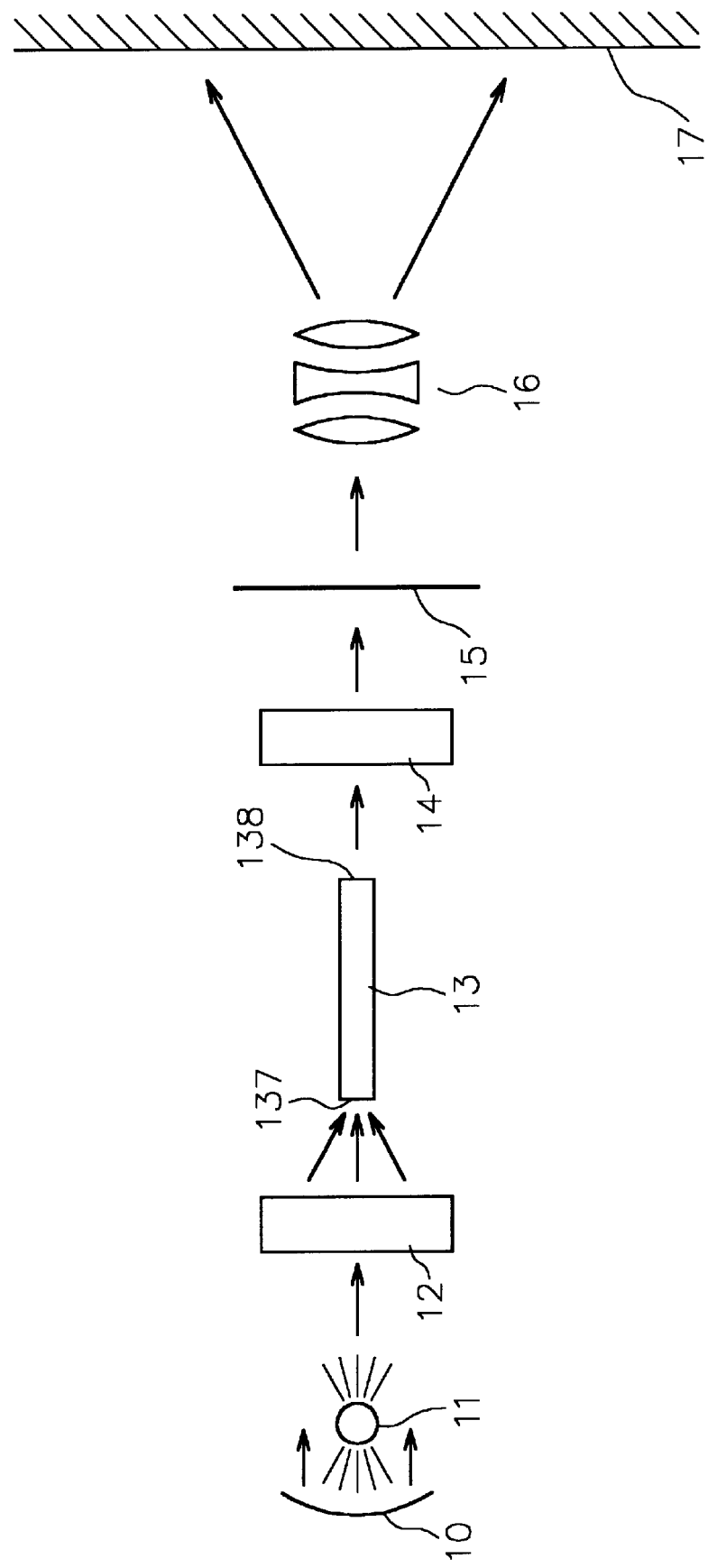
FIG. 1 is a schematic diagram of the optical system of the conventional projecting apparatus provided with a transmissive LCD.
Figure 2:
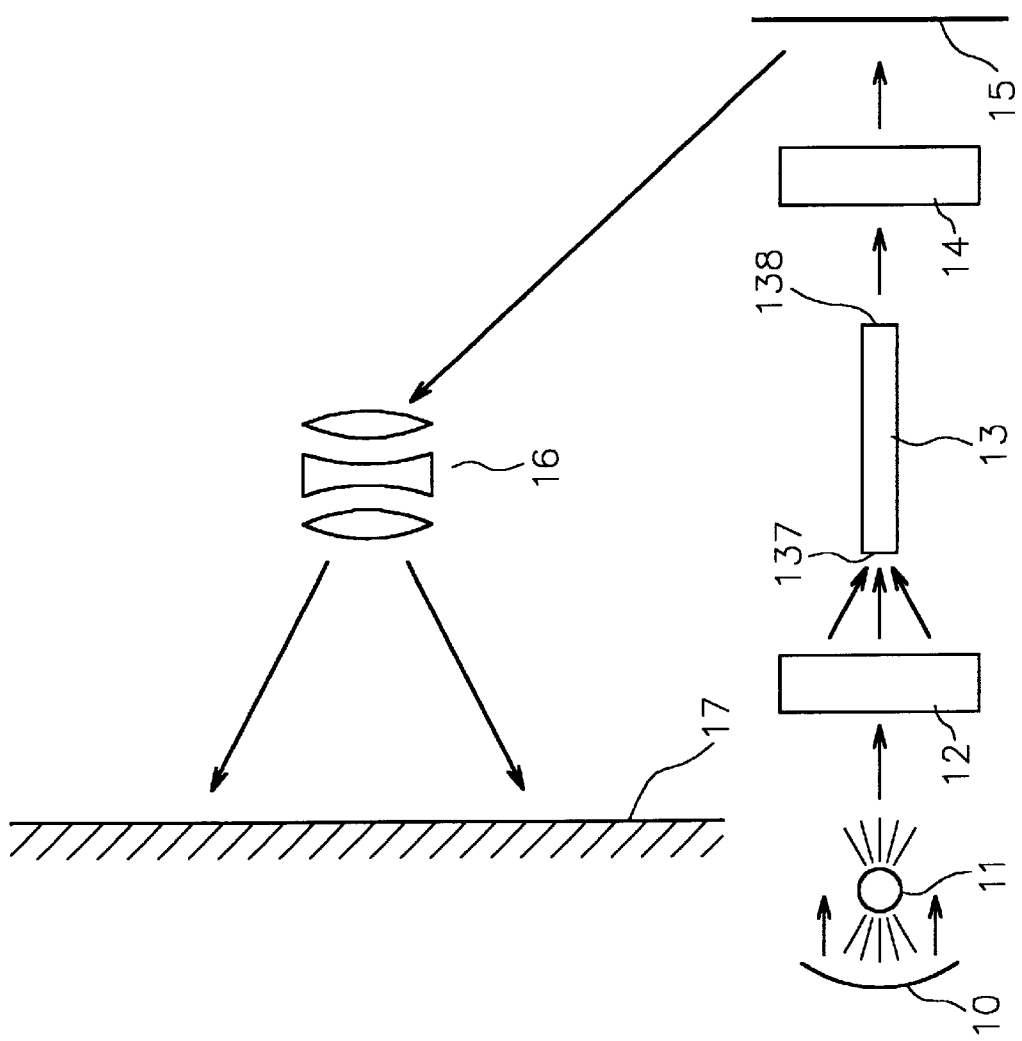
FIG. 2 is a schematic diagram of the optical system of the conventional projecting apparatus provided with a DMD.
Figure 3:
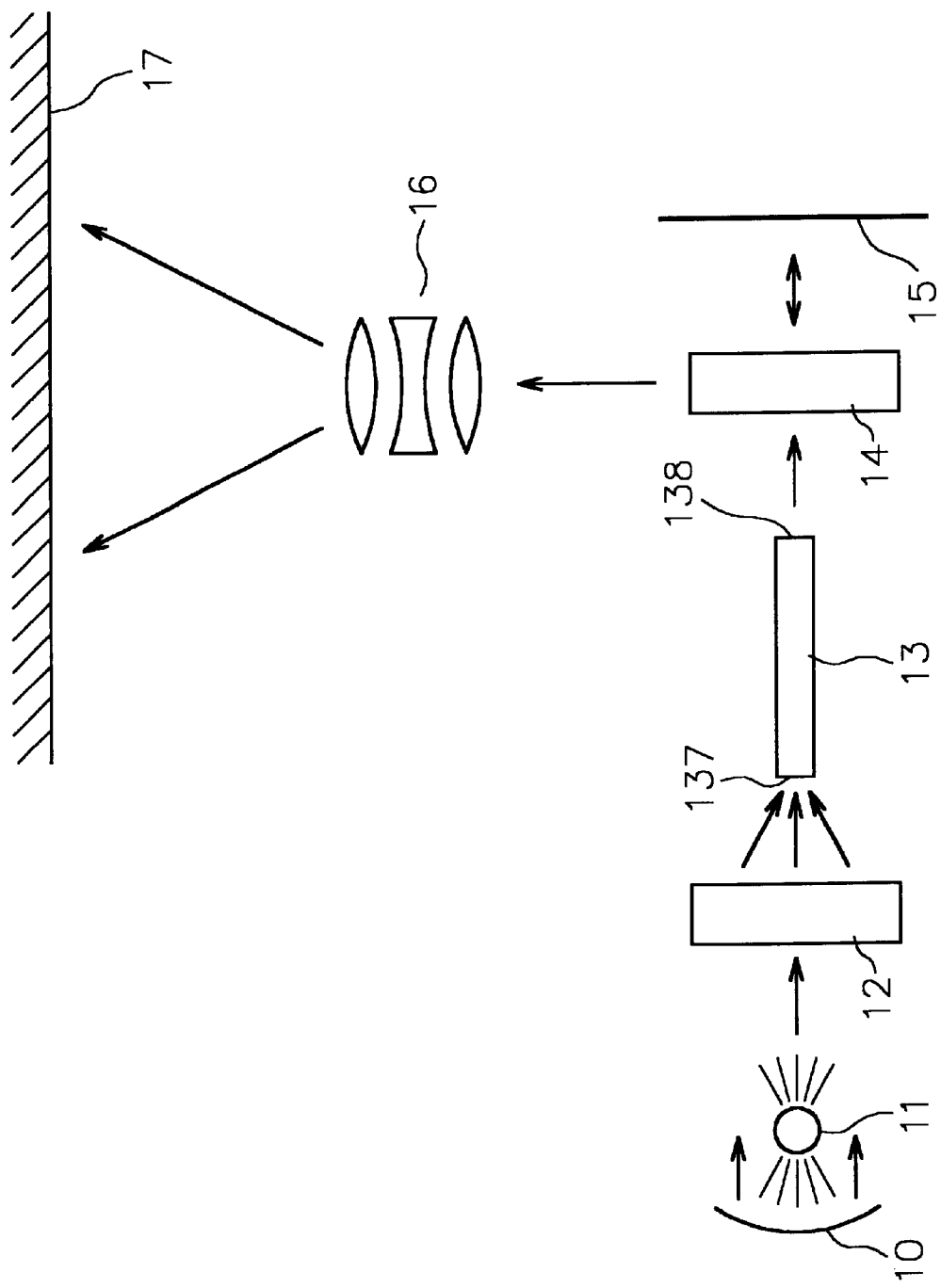
FIG. 3 is a schematic diagram of the optical system of the conventional projecting apparatus provided with the reflective LCD.
Figure 4:
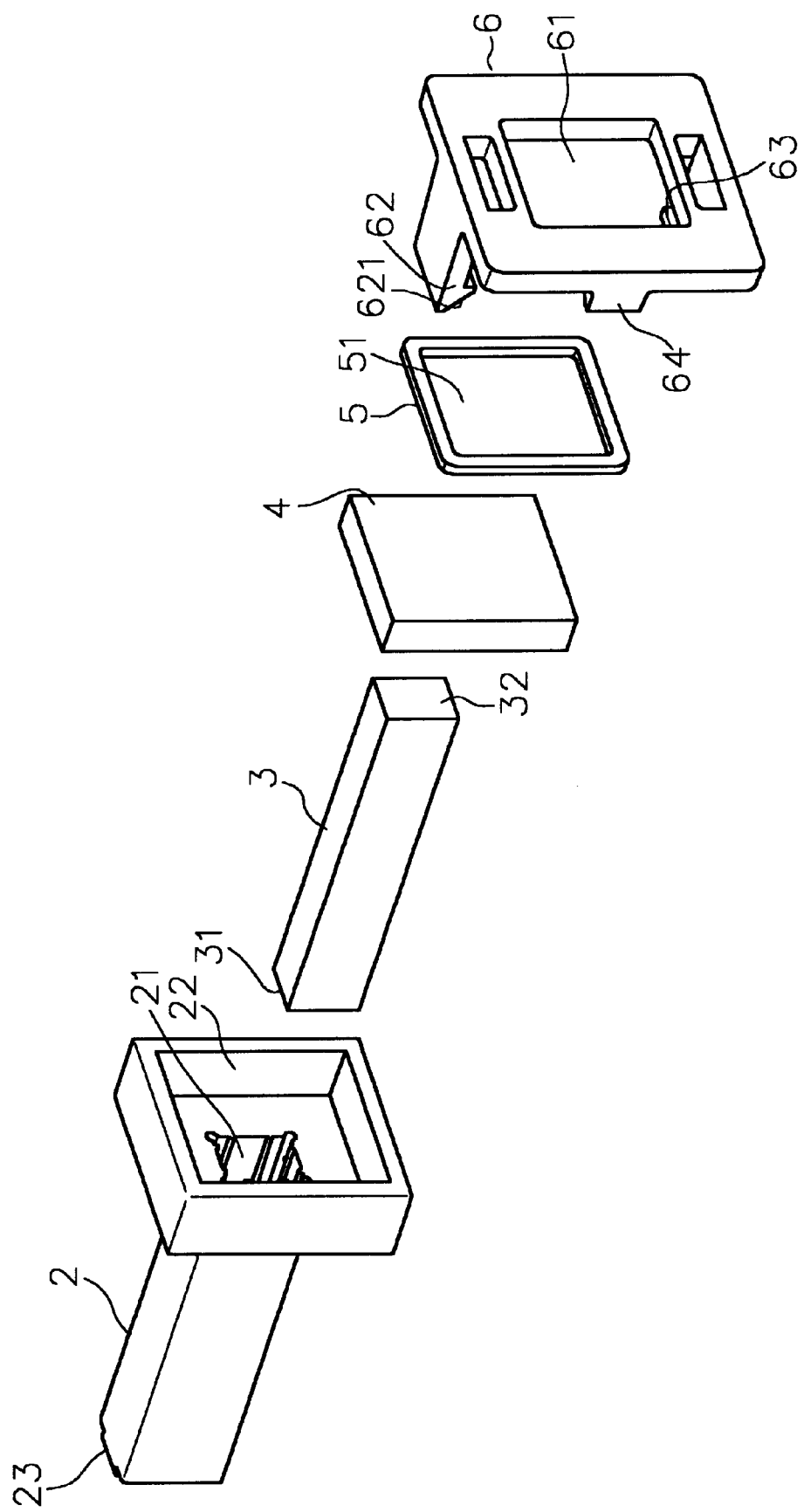
FIG. 4 is a schematic structural diagram of a dust-proof structure of a solid integration rod for projecting apparatuses according to the prior art.
Figure 5:
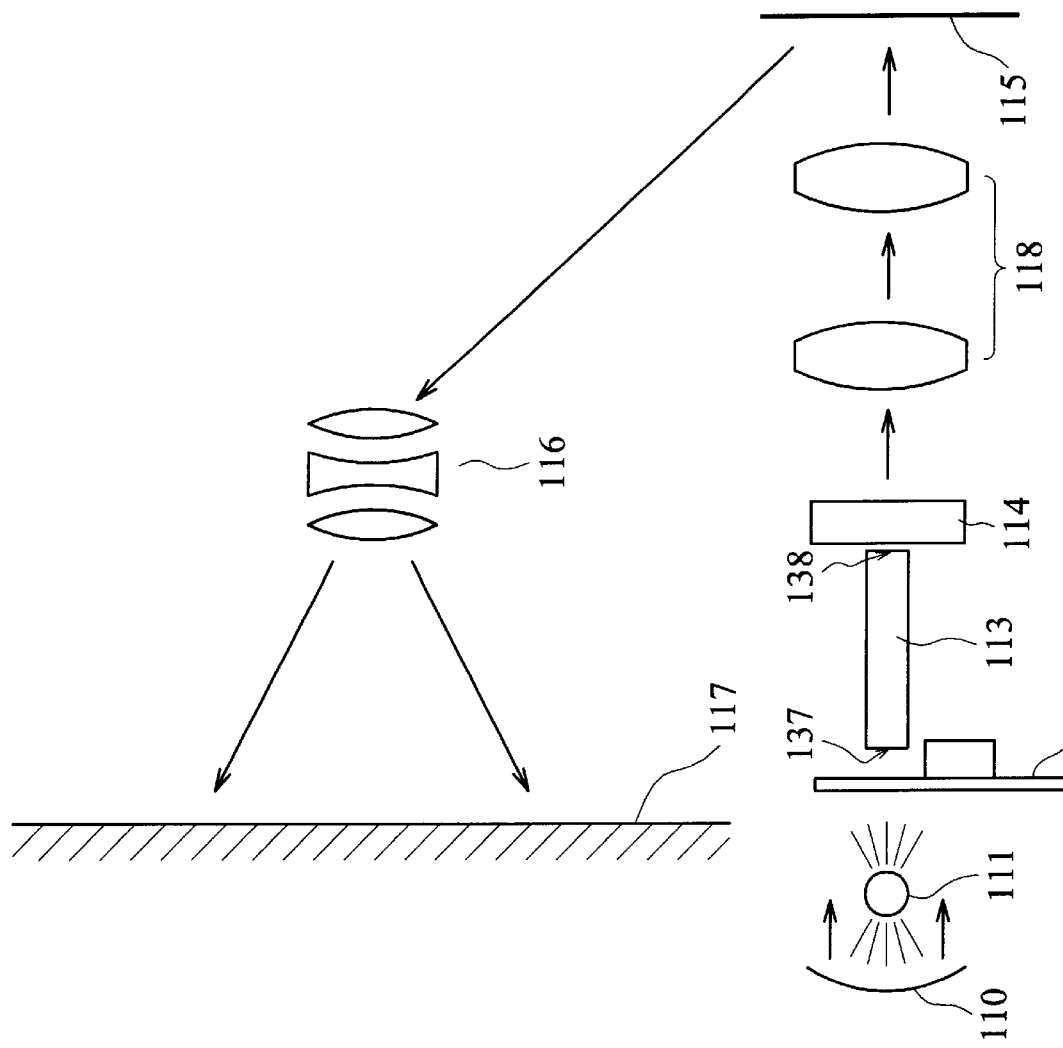
FIG. 5 is a three-dimensional exploded diagram of the preferred embodiment according to the invention.

FIG. 5 is a three-dimensional exploded view of the preferred embodiment of a projecting apparatus according to the invention. As shown in FIG. 5, the projecting apparatus according to the invention includes a reflection mirror 110, a light source 111, a color wheel 112, a solid integration rod 113, a dust-proof element 114, an illumination system 118, a projecting display apparatus 115, an image formation device 116, and a display screen 117. The solid integration rod 113 being an optical element utilized to homogenize the light after passing through the rod includes an incident-beam surface 137 and an outgoing-beam surface 138. The dust-proof element 114 is adhered to the outgoing-beam surface 138 of the solid integration rod 113 with adhesive in order to prevent dust from staining to the outgoing-beam surface 138.

By means of structure mentioned above, the light is either directly transmitted from the light source 111 or is reflected from the reflection mirror 110 and then is focused on the incident-beam surface 137 of the solid integration rod 113. After passing through the solid integration rod 113, the light is homogenized. Thereafter, the light passes through the dust-proof element 114 and through the illumination system 118. Finally, the light is projected to the projecting display apparatus 115 in order to show the image of the projecting display apparatus 115 on the display screen 117 through the image formation device 116.

Figure 6A:
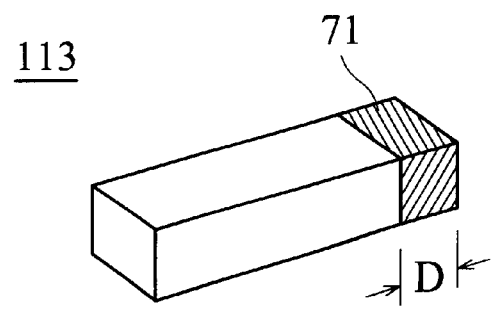
FIG. 6a is a schematic structural diagram of a solid integration of the preferred embodiment according to the invention.
Figure 6B:
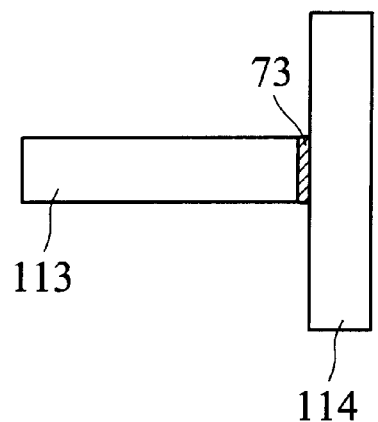
FIG. 6b is a schematic structural diagram of the preferred embodiment of the adherence of a solid integration rod and a dust-proof device without flare portion according to the invention.
Figure 6C:
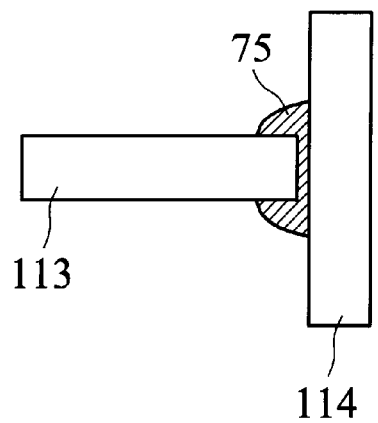
FIG. 6c is a schematic structural diagram of the preferred embodiment of the adherence of a solid integration rod and a dust-proof device with flare portion according to the invention.

FIG. 6a is a schematic structural diagram of a solid integration of the preferred embodiment according to the invention. FIG. 6b is a schematic structural diagram showing the preferred embodiment for the adherence of a dust-proof device to a solid integration rod without a flare portion according to the invention. FIG. 6c is a schematic structural diagram showing the preferred embodiment for the adherence of a dust-proof device to a solid integration rod with a flare portion according to the invention. As shown in FIG. 6c, when the flare portion appears after the adherence of a dust-proof element 114 to a solid integration rod 113, part of the light beam inside the solid integration rod will be refracted through the flare portion of the adhesive. This will result in the loss of light energy. As shown in FIG. 6a and FIG. 6c, a metal reflecting film 71 is coated on circumferential outer surface of the solid integration rod 113 before the dust-proof element 114 is adhered to the solid integration rod 113. The metal reflecting film 71 with a length in axial direction "D" of 0.05 mm~5 mm is coated at the end of the outgoing-beam surface 138 of the solid integration rod 113 so as to isolate the area of the solid integration rod 113 covered by the flare portion 75. Thus, the light transmitted to the area of the solid integration rod 113 covered by the flare portion 75 will be reflected from the metal reflecting film 75 back into the solid integration rod 113 because of the isolation of the metal reflecting film 75. And, since the light inside the solid integration rod 113 is not refracted through the flare portion 75, the light energy will not be lost.

While the invention has been described with reference to a preferred aspect of embodiments mentioned above, it should not be considered as a limitation of the scope of the invention but an illustration of the technical contents. Various possible modifications and alterations could be performed by persons who are skilled in the art without departing from the principles of the invention. It is intended that the following claims define the invention and that the structure within the scope of these claims and their equivalents be covered thereby.

What is claimed is:

1. A dust-proof device for a solid integration rod in projecting apparatuses comprising:

a dust-proof element adhered to said solid integration rod with adhesive; and a layer of metal reflecting film, with a certain length in axial direction, coated on the circumferential outer surface at an end of said solid integration rod that is adhered to said dust-proof element;

wherein, if a flared portion of adhesive occurs after said dust-proof element is adhered to said solid integration rod, the light will still be normally reflected by said metal reflecting film so that the light energy will not be lost through said flare portion.

2. The dust-proof device for a solid integration rod in projecting apparatuses of claim 1, wherein the length in axial direction of said metal reflecting film is between 0.05 mm and 5 mm.

3. The dust-proof device for a solid integration rod in projecting apparatuses of claim 1 wherein said metal reflecting film is made of a material selected from a group consisting of aluminum alloy, sliver, gold, copper, or chrome.

4. A dust-proof device for a solid integration rod in projecting apparatuses comprising:

a dust-proof element adhered to said solid integration rod with adhesive.

* * * * *